(12) United States Patent
Pellingra, Jr. et al.

(10) Patent No.: US 7,537,829 B2
(45) Date of Patent: May 26, 2009

(54) MULTI-LAYER FILMS HAVING IMPROVED SEALING PROPERTIES

(75) Inventors: Salvatore J. Pellingra, Jr., Wolcott, NY (US); Michael J. Bader, Fairport, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 432 days.

(21) Appl. No.: 11/096,298

(22) Filed: Apr. 1, 2005

(65) Prior Publication Data

US 2005/0238874 A1    Oct. 27, 2005

Related U.S. Application Data

(63) Continuation-in-part of application No. 10/079,662, filed on Feb. 20, 2002, now abandoned, which is a continuation-in-part of application No. 09/791,325, filed on Feb. 22, 2001, now abandoned.

(60) Provisional application No. 60/559,369, filed on Apr. 2, 2004.

(51) Int. Cl.
    B32B 27/08 (2006.01)
    B32B 27/18 (2006.01)
    B32B 27/32 (2006.01)
    B32B 7/12 (2006.01)

(52) U.S. Cl. ............ 428/336; 428/334; 428/339; 428/343; 428/346; 428/347; 428/349; 428/355 EN; 428/500; 428/515; 428/516; 428/520; 428/522; 428/523

(58) Field of Classification Search .......... None
See application file for complete search history.

(56) References Cited

U.S. PATENT DOCUMENTS

| 3,753,769 | A |   | 8/1973  | Steiner           |         |
|-----------|---|---|---------|-------------------|---------|
| 4,058,645 | A |   | 11/1977 | Steiner           |         |
| 4,214,039 | A |   | 7/1980  | Steiner et al.    |         |
| 4,439,493 | A |   | 3/1984  | Hein et al.       |         |
| 4,447,494 | A |   | 5/1984  | Wagner, Jr. et al.|         |
| 4,565,720 | A | * | 1/1986  | Yaeo et al.       | 383/116 |
| 4,574,104 | A | * | 3/1986  | Aishima et al.    | 428/220 |

(Continued)

FOREIGN PATENT DOCUMENTS

DE          4202663      *    8/1993

(Continued)

OTHER PUBLICATIONS

Schimtz, Peter et al., "Films." Ullmann's Encyclopedia of Industrial Chemistry, 5th Ed., vol. A11 (1988), pp. 85-95, 105-06, 108-110.*

(Continued)

*Primary Examiner*—Vivian Chen

(57) ABSTRACT

Multi-layer films that are suitable for packaging and having improved sealing properties are disclosed. Some embodiments may also provide a lower minimum sealing temperature. A soft polymer is blended in a core layer and a tie layer comprising the soft polymer and, optionally, another polymer. A sealable layer is provided on the side of the tie layer opposite the core layer. The multi-layer films may be transparent, contain a cavitating agent, or are pigmented to form an opaque film. Also, the multi-layer film may be metallized or coated with a barrier coating.

21 Claims, 6 Drawing Sheets

Film Structure of Example 3:

U.S. PATENT DOCUMENTS

| | | | |
|---|---|---|---|
| 4,961,992 A | 10/1990 | Balloni et al. | |
| 4,983,435 A * | 1/1991 | Ueki et al. | 428/36.6 |
| 5,019,447 A | 5/1991 | Keller | |
| 5,057,177 A | 10/1991 | Balloni et al. | |
| 5,212,009 A | 5/1993 | Peiffer et al. | |
| 5,230,963 A | 7/1993 | Knoerzer | |
| 5,272,016 A * | 12/1993 | Ralph | 428/516 |
| 5,300,353 A * | 4/1994 | Yoshimura et al. | 428/213 |
| 5,443,765 A * | 8/1995 | Yoshimura et al. | 264/488 |
| 5,527,608 A | 6/1996 | Kemp-Patchett et al. | |
| 5,541,236 A * | 7/1996 | DeNicola et al. | 522/157 |
| 5,667,902 A | 9/1997 | Brew et al. | |
| 5,695,840 A * | 12/1997 | Mueller | 428/35.7 |
| 5,759,648 A * | 6/1998 | Idlas | 428/34.9 |
| 5,888,648 A * | 3/1999 | Donovan et al. | 428/349 |
| 6,027,776 A * | 2/2000 | Mueller | 428/35.2 |
| 6,165,610 A | 12/2000 | Moore et al. | |
| 6,316,067 B1 * | 11/2001 | Edwards et al. | 428/34.9 |
| 6,326,068 B1 | 12/2001 | Kong et al. | |
| 6,391,411 B1 | 5/2002 | Duckwall, Jr. et al. | |
| 6,461,706 B1 * | 10/2002 | Freedman et al. | 428/40.1 |
| 6,534,137 B1 | 3/2003 | Vadhar | |
| 6,624,247 B2 | 9/2003 | Kume et al. | |
| 6,641,913 B1 | 11/2003 | Hanyu et al. | |
| 6,682,825 B1 * | 1/2004 | Kennedy et al. | 428/517 |
| 6,726,969 B1 * | 4/2004 | Balaji et al. | 428/35.7 |
| 6,858,288 B2 * | 2/2005 | Shibata et al. | 428/213 |
| 6,969,556 B2 * | 11/2005 | Jeschke | 428/515 |
| 2002/0164470 A1 | 11/2002 | Bader | |
| 2008/0070047 A1 * | 3/2008 | Rehkugler et al. | 428/457 |

FOREIGN PATENT DOCUMENTS

| | | | |
|---|---|---|---|
| EP | 0595701 | * | 5/1994 |
| JP | 58 175635 | | 10/1983 |
| JP | 08 025594 | | 1/1996 |

OTHER PUBLICATIONS

Voght, Chris New metallized-OPP film replaces foil. Converting Magazine [online], Feb. 2002 [retrieved on Nov. 16, 2004]. Retrieved freom the Internet:<URL: http://convertingmagazine.com/currentissue/current.cgi?tem=print&view=1104_36.html>.

* cited by examiner

Control Film Structure of Example 1:

Control Film Structure of Example 2:

Film Structure of Example 3:

Control Film Structure of Example 4:

Film Structure of Example 5:

Film Structure of Example 6:

MULTI-LAYER FILMS HAVING IMPROVED SEALING PROPERTIES

CROSS-REFERENCE TO RELATED APPLICATIONS

This non-provisional U.S. patent application claims benefit to provisional U.S. application Ser. No. 60/559,369, filed Apr. 2, 2004, and is a continuation-in-part of U.S. application Ser. No. 10/079,662, filed Feb. 20, 2002, now abandoned, which in turn, is a continuation-in-part of application Ser. No. 09/791,325, filed Feb. 22, 2001, now abandoned. The specifications of each of the three aforementioned applications are incorporated herein by reference.

TECHNICAL FIELD

This invention relates generally to heat-sealable, multi-layer polymer films having improved sealing properties. More specifically, this invention relates to such multi-layer polymer films that contain polymer structures comprising one or more "soft" polymers.

BACKGROUND OF THE INVENTION

Polypropylene-based multi-layer films are widely used in packaging applications, such as pouches for dry food mixes, pet foods, snack foods, and seeds. Such multi-layer films must have the ability to form reliable hermetic seals at relatively low temperature and, in some instances, the film must do so in the presence of contamination in the seal region, from the contents of the pouches.

U.S. Pat. No. 6,624,247 B1 to Kume et al. (Sumitomo Chemical Company, Ltd.) discloses a polypropylene-based film of a resin composition (C) comprising: 40 to 95 weight percent of a propylene-based copolymer (A) selected from a propylene random copolymer (i) of propylene with ethylene and/or alpha-olefin and a propylene-based copolymer (ii) composed of 1 to 30 weight percent of a component (a) obtained by copolymerizing propylene, an alpha-olefin and ethylene in a first step; and 70 to 99 weight percent of a component (b) obtained by copolymerizing those in the subsequent step, in which the copolymerization ratio is different from that in the first step; and 5 to 60 weight percent of a polypropylene-ethylene and/or alpha-olefin block copolymer (B) having a xylene soluble component ("CXS") of 5.0 weight percent or more, wherein the CXS has a content of ethylene and/or the alpha-olefin of 14 to 35 molar percent and wherein the heat-seal temperature of the film of the composition (C) is lower by 3° C. (5.4° F.) or more than those of respective films of the compositions (A) or (B).

U.S. Pat. No. 6,641,913 B1 to Hanyu et al. (Fina Technology, Inc.) discloses a multi-layer polyolefin film of the type suitable for packaging application in which heat seals are formed. The multi-layer film comprises a substrate layer formed of a crystalline thermoplastic polymer having an interface surface. A heat-sealable surface layer is bonded to the interface surface of the substrate layer and is formed of a syndiotactic propylene polymer effective to produce a heat seal with itself at a sealing temperature of less than 110° C. (230° F.). The multi-layer film may be biaxially-oriented. In the production of the multi-layer film, a crystalline thermoplastic polymer is extruded and formed into a substrate layer film. A second polymer comprising a syndiotactic propylene polymer which is effective to form a heat-sealable surface layer is extruded separately to form a surface layer that is thereafter bonded to the interface of the substrate layer at a temperature within the range of 150-260° C.

U.S. Pat. No. 6,534,137 B1 to Vadhar (Cryovac, Inc.) discloses a two-component laminated multi-layer film suitable for use in packaging articles, such as pet food, comprising a first component and a non-heat-shrinkable second component. The first component comprises an outer first film layer, an optional second film layer, and an optional third film layer. The first and third film layers comprise ethylene/alpha-olefin copolymer, while the second film layer is a modified ethylene copolymer. The second component comprises an outer fourth layer, an oxygen barrier fifth layer, sixth and seventh layers which serve as tie layers and are positioned on either side of the barrier layer. The multi-layer film is heat sealable to itself and another film.

U.S. Pat. No. 5,888,648 to Donovan et al. (Mobil Oil Corporation) discloses a multi-layer film which has an improved composite structure for providing hermetic seals to packages manufactured in a high speed packaging apparatus. The structure of the multi-layer film includes a main substrate and a sealant layer. The sealant layer, in turn, includes an intermediate layer which has the primary function of compliance during sealing and a sealing layer which has the primary function of providing adhesivity to the completed seal.

U.S. Pat. No. 6,326,068 to Kong et al. (Mobil Oil Corporation) discloses a multi-layer film that has an improved composite structure for providing hermetic seals to packages manufactured in a high speed packaging apparatus. The structure of the multi-layer film includes layers A/B/C/D. Skin layer A is formed from polypropylene copolymer with melt flow rate greater than one or linear high density polyethylene with melt index greater than one. Core layer B is formed from polypropylene. Intermediate layer C has the primary function of compliance during sealing, and sealing layer D has the primary function of providing adhesivity to the completed seal. The sealing layer D includes an anti-blocking agent comprising non-distortable organic polymer particles having an average particle size greater than 6 microns.

Related U.S. application Ser. No. 10/079,662 to Bader, filed on Feb. 20, 2002, discloses a core layer B that comprises a softening additive blended in a core layer to improve the hermeticity of a sealed package. The softening additive enhances compliance of the core layer with the sealable layer while the seal area is heated under pressure within the crimp jaws during sealing operations. The invention of the '662 application functions during sealing operations to effect a more hermetic seal. The '662 application does not teach effecting a more resilient or durable "post-sealing" seal. The term "compliance" as used in the '662 application is related to non-elastic, deformation or conformance within the sealing jaws during sealing operations due to the improved flowability of the core during heated sealing operation and does not refer to post-sealing seal strength and post-sealing seal performance. It is possible to improve hermeticity as per the '662 application without necessarily, substantially improving minimum seal strength.

Though each of the above films represented a variety of improvements related to packaging films, none of the above films combine desired improvements in processability, seal strength, impact strength, hermeticity, durability, and sufficiently reduced seal temperatures for some of today's challenging packaging operations. Opportunities exist for polymer films to replace other packaging substrates, such as paper and foil, in many temperature-sensitive packaging operations, such as with ice cream bars, chocolate bars, and dry-particulate foods. The present invention meets these and other needs.

SUMMARY OF THE INVENTION

The present invention primarily relates to multi-layer films having improved low temperature sealing properties and improved seal strength. Films according to this invention comprise an arrangement of co-extruded polymeric layers that contribute individually and collectively to improving seal strength, impact strength, resilience, hermeticity, and reduced-temperature sealability of the film. The multi-layer film comprises at least a core layer, a first tie layer and a sealant layer. The seal strength of such seal is greater than about 500 grams per inch, preferably greater than about 1000 grams per inch, more preferably greater than about 1500 grams per inch, and most preferably greater than about 2000 grams per inch, for a seal of said sealant layer to itself. In some embodiments, the minimum seal temperature of the multi-layer films of this invention are preferably less than or equal to about 200° F. (93° C.), more preferably less than or equal to about 180° F. (82.2° C.), even more preferably less than or equal to about 176° F. (80.0° C.), and most preferably less than or equal to about 170° F. (76.7° C.).

Each of the seal layer, the tie layer, and the core layer function together to effect a multi-layer film whereby the sealing function of the film realizes improved performance through an integration of layers that are more compliant or resilient than prior films, when subjected to the pressures of sealing jaws and when subjected to subsequent stresses on the seal, such as seal opening forces. The seal strength is enhanced by reducing the modulus of the core and tie layers and improving the melt or flow characteristics of these layers during sealing. Decreasing the melt temperature of the layers, including particularly the tie layer, may increase the degree of entanglement and intermingling of the adjacent layers. Thus, the layers enjoy improved bonding, delamination and destruction resistance, and improved flowing in seal folds or creases, thereby effecting improved seal strength while simultaneously facilitating a reduced frequency of leak-paths in critical seal areas, such as seal corners, folds or creases. The reduced modulus or improved elasticity of the film permits improved diffusion throughout the layers of forces or stresses applied to the seal, thereby facilitating improved seal strength. Additionally, depending upon the particular resin component selection, some embodiments may also enjoy lowered minimum seal temperatures.

The terms "compliant" or "compliance" as used herein refer to the ability of the sealed area of film to deform or conform within the sealing jaws during sealing operations and additionally to elastically and/or plastically deform and diffuse stress throughout the multi-layer film substrate subsequent to sealing operations when the seal is subjected to stress.

In film embodiments according to the present invention, the core layer comprises a core polymer and at least one functionally soft polymer. Preferably, the core polymer comprises propylene or ethylene polymer. In some preferred embodiments, the core polymer comprises isotactic polypropylene (iPP) homopolymer. The soft polymer improves the compliance or resilience of the core layer both during and after sealing. Examples of acceptable soft polymers include impact and block copolymers, cross-linked polymers, metallocene catalyzed random copolymers, syndiotactic propylene, propylene copolymers, metallocene catalyzed polypropylene, random and mini-random propylene copolymers, polyethylene and polyethylene copolymers and other polymers having reduced modulus or improved elastic properties as compared to more crystalline polymers, such as isotactic polypropylene or high density polyethylene, which do not qualify as acceptable soft polymers. The core layer may preferably comprise at least 10 percent by weight of the core layer of the soft polymer.

The first tie layer is preferably contiguous to the core layer and comprises at least one functionally "soft" polymer, such as in the core layer. The tie layer may also, optionally, comprise a tie layer polymer. In embodiments where the optional tie layer polymer is present, the tie layer comprises from about 5 percent by weight to about 95 percent by weight of the tie layer polymer. More preferably, the tie layer comprises between about 25 percent by weight to about 75 percent by weight of the tie layer polymer. The optional tie layer polymer may comprise, for example, a polypropylene homopolymer or an ethylene-propylene (EP) copolymer. The first tie layer may comprise multiple layers between the sealant layer and the core layer.

In other embodiments, the core layer may also include at least one additive selected from an opacifying agent, a void-initiating particle, a hydrocarbon resin, and combinations thereof.

The sealant layer is contiguous to the first tie layer and may comprise substantially any suitable polymer as may be used as a sealable layer. Preferably, the sealant layer comprises a polymer that has a reduced melting temperature as compared to more crystalline polymers. For example, suitable sealant layer polymers may comprise a polymer selected from the group consisting of EP copolymer, PB copolymer, EPB terpolymer and metallocene-catalyzed polypropylene homopolymer (mPP), and blends thereof. The tie layer may also comprise processing and manufacturing aids, such as silicone oil and anti-block agents.

In another embodiment, the multi-layer film further comprises an outer skin layer contiguous to the core layer, but on a side of the core layer opposite the sealant layer. The outer skin layer may comprise a polymer that provides a printable or metallizable layer or that enhances processability of the film. For example, the outer skin layer may comprise a polymer selected from the group consisting of polyethylene (PE) polymer, PP polymer, an EP copolymer, and blends thereof. Also, a second tie layer is contemplated that is contiguous to the core layer, positioned between the core layer and the outer skin layer. Preferably, the second tie layer comprises a propylene or ethylene polymer and, optionally, at least one soft polymer, and blends thereof.

The multi-layer film of this invention is preferably oriented in at least one direction, more preferably biaxially oriented. The film may be surface treated to receive one or more coatings, such as barrier coatings, and/or to receive metallization, and may be formed into a package to enclose a product.

DRAWINGS OF THE INVENTION

DESCRIPTION OF THE INVENTION

Figure 1:
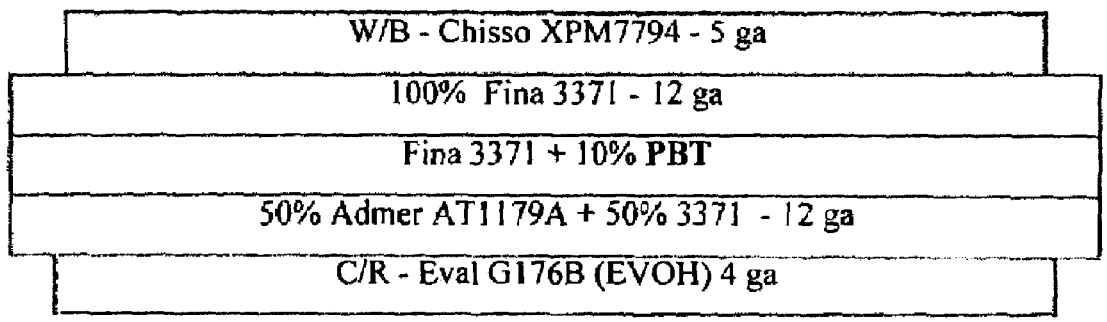
FIG. 1 illustrates an example of a control film structure.

This invention comprises an improved multi-layer film, typically a polymeric film, having improved sealing properties, comprising:

a core layer having a first side and a second side, said core layer comprising a core polymer and at least one soft polymer;

a first tie layer having a first side and a second side, the second side of the first tie layer on the first side of said core layer, said first tie layer comprising a soft polymer and, optionally, a tie layer polymer, the optional tie layer polymer comprising at least one of a $C_2$-$C_8$ alpha-olefin homo-, co-, or terpolymer, a metallocene catalyzed homo-, co-, or terpolymer comprising propylene, and blends thereof, and a sealant layer on the first side of the first tie layer.

In the multi-layer films of this invention, one or more soft polymers are blended or provided into one or more film layers to facilitate improved seal strengths and in some embodiments, reduced temperature sealing temperatures and low-temperature sealing properties. The multi-layer films comprise a "soft" polymer as a fractional component of the core layer and preferably as the sole or majority component of the tie layer. The soft polymer may be considered a softening or compliance-enhancing additive. A sealable layer is provided on the side of the tie layer opposite the core layer. The presence of the soft polymer permits each of at least a core layer, a tie layer, and a sealable layer to act synergistically with each other to dissipate stress throughout the layers. When force is applied to a seal of the sealable layer to itself, the film diffuses or dissipates the stress throughout each of the three layers through improved plastic deformation or compliance, instead of leaving the stress concentrated in the seal layer. A seal that dissipates the stress may generally facilitate a stronger seal than the same film having a concentrated stress region.

It is contemplated that further seal strength benefit may be realized in the seal area through improved bonding interaction between the core, tie, and seal layers. This improved bonding is a result of improved flowability of the soft polymer, both within the layers comprising the soft polymer and at the interface with the layers adjacent to soft-polymer-containing layers, resulting in improved interlayer molecular intermingling at the layer interfaces. Benefits of the improved flowability manifest film improvement during both co-extrusion of the multi-layer film and then again during sealing operations.

As a result of the improved elasticity or compliance, the films according to this invention may also provide improvements in seal strength integrity and improved hermetic sealing, particularly in the more leak-prone folds, creases and seams in the seal area, due to the improved film conformability during sealing.

In one embodiment, the multi-layer film is a three-layer structure comprising a core layer, a first tie layer and a sealable skin layer, wherein the core layer comprises a blend of at least one soft polymer and the first tie layer comprises at least one soft polymer. In another embodiment, the multi-layer film is a four-layer structure which further comprises an outer layer on a side of the core layer opposite the first tie layer and sealable layer.

In still another embodiment, the multi-layer film is a film having a five-layer structure comprising a core layer, first and second tie layers, a sealant layer and an outer skin layer. The second tie layer is positioned between the core layer and the outer layer. The soft polymer is provided in the core layer, the first tie layer and, optionally, to the second tie layer.

In still yet another embodiment, the multi-layer film is a cavitated, white or opaque film due to the addition of a cavitating agent to the core layer and/or pigments such as titanium dioxide to one or more of the layers. In any embodiment of this invention, the multi-layer films may be used stand-alone as monoweb packaging films, laminated to other films or substrates, or formed into a package or pouch to enclose or contain a product or material.

The minimum seal temperature of the multi-layer films of this invention are preferably less than or equal to about 200° F. (93° C.), more preferably the minimum seal temperature is less than or equal to about 180° F. (82.2° C.), even more preferably the minimum seal temperature is less than or equal to about 176° F. (80.0° C.), and most preferably the minimum seal temperature is less than or equal to about 170° F. (76.7° C.), when a seal is formed by a crimp sealer of 200 gram weight, 20 psi pressure and 0.75 sec. dwell time of the sealant layer to itself. Such minimum sealing temperatures are determined in accordance with methods described herein.

The seal strength of the multi-layer films of this invention is greater than about 500 grams/inch; preferably, the seal strength is greater than about 1000 grams/inch; and most preferably, greater than about 1500 grams/inch, when seals are formed using a crimp sealer at a temperature of at least 190° F. (87.8° C.) such seal strength determined in accordance with the methods described herein. The films will preferably have a seal strength of greater than about 600 grams per inch for a seal formed on a crimp sealer at a temperature of at least 200° F. (93.3° C.). In some embodiments, the films according to this invention will have a seal strength of at least 1000 grams per inch when sealed at a temperature of at least 200° F. (93.3° C.).

The detailed description below is given solely for the purpose of illustrating certain embodiments of the invention and should not be taken as limiting the present inventive concepts to these specific embodiments. To the extent that this description is specific to a particular embodiment, this is for purposes of illustration only and should not be taken as limiting the present inventive concepts to these specific embodiments.

"Soft" Polymers

Acceptable soft polymers include polymer resins that are less stiff, have lower modulus, are more flexible and elastic, and tend to have a more plastic stress-strain behavior than the more common polymer film-forming resins such as isotactic polypropylene and high density polyethylene. Acceptable polymer resins also include, but are not limited to, resins having more elastic or amorphous-type functional properties as opposed to more crystalline properties.

For further example, another acceptable resin group includes, but is not limited to, impact copolymers or heterophasic polymer blends that typically contain from about 5 to 25 percent by weight of an elastomeric compound to incorporate rubber-like properties to the normally rigid backbone of polypropylene-based polymers. Other heterophasic copolymers, such as those made by Basell's Catalloy™ process may contain over 25 weight percent and even in excess of 50 weight percent of elastomeric compound. For the exemplary Catalloy™ or impact polymers, the elastomeric component of the impact polymer may include, but are not limited to, acrylonitrile-chloroprene copolymer, acrylonitrile-isoprene copolymer, butadiene-acrylonitrile copolymer, chlorinated polyethylene, chlorosulfonated polyethylene, ethylene-ether polysulfite, ethylene-ethyl acrylate copolymer, ethylene polysulfite, ethylene-propylene copolymer, ethylene-propylene-diene terpolymer, fluoroelastomer, fluorosilicone, hexafluoropropylene-vinylidene fluoride copolymer, isobutene-isoprene copolymer, organopolysiloxane, acrylic ester-butadiene copolymer, polybutadiene, polychloroprene, polyepichlorohydrin, polyisobutene, polyisoprene, polyurethane, styrene-butadiene copolymer, styrene-chloroprene copolymer, polyethylene-butyl graft copolymer, styrene-butadiene-styrene triblock polymer, and blends thereof.

Other acceptable soft polymers comprise a PB copolymer such as Shell SRD4-141 (commercially available from Shell Chemical Company); plastomers, such as Vistamax VMX1000 or VMX3000 (commercially available from ExxonMobil Chemical); and EPB terpolymer such as Chisso XPM7800 (commercially available from Chisso Chemical Company).

The other polymer component of the exemplary heterophasic copolymers may include, for example, ethylene- and propylene-based polymers including, but not limited to, polyolefins selected from the group consisting of propylene (PP) homopolymer, ethylene-propylene (EP) copolymer, ethylene-propylene-butylene (EPB) terpolymer, propylene-butylene (PB) copolymer, and blends thereof.

In addition to the exemplary heterophasic or Catalloy™ impact-type polymers, numerous other polymers or polymer blends are acceptable as the soft polymer. For example, other acceptable polymers may include block copolymers, copolymers and terpolymers including $C_2$-$C_8$ alpha-olefins, and random copolymers. The acceptable soft polymers may be the product of Ziegler-Natta or metallocene catalysis.

As used herein, the term "soft polymer" may be defined to include those homopolymers, copolymers, terpolymers, or other polymers having at least one of the following properties:

Melting point temperature, "$T_m$" less than or equal to about 288° F. (142° C.);

Vicat Softening Point (ASTM D1525) of less than or equal to about 221° F. (105° C.); and/or Flexural Modulus (ASTM D790) of less than or equal to about 80 kpsi.

Soft polymers will most commonly include those polymers having a flexural modulus (ASTM D790) of less than about 80 Kpsi. Preferably, soft polymers include those polymers having a flexural modulus of less than about 50 Kpsi, and for some embodiments and most preferably for some embodiments a flexural modulus of less than about 20 Kpsi. In some preferred embodiments, the soft polymers will be a polyolefin co- or terpolymer and may have a melting point temperature $T_m$ equal to or less than about 288° F. (142° C.), more preferably equal to or less than about 248° F. (120° C.), and even more preferably for some embodiments, equal to or less than about 212° F. (100° C.). The soft resins may also be defined as those resins having a Vicat softening point (VSP) (ASTM D1525) of less than or equal to about 221° F. (105° C.), more preferably of less than or equal to about 176° F. (80° C.), and for some embodiments, most preferably of less than or equal to about 150° F. (65° C.).

Core Layer

The core layer of the embodiments of this invention has a first side and a second side and comprises a polymer blend material of a core layer polymer, such as a propylene polymer, and at least one soft polymer. In some embodiments, the core layer polymer is preferably an isotactic propylene (iPP) homopolymer. An example of a suitable iPP is Fina 3371 (commercially available from Fina Oil and Chemical Company) or Exxon 4612 (commercially available from ExxonMobil Chemical Company). In many embodiments, the soft polymer in the core layer is preferably a rubberized EP copolymer, such as Adflex T100F, which is a Catalloy™ process resin (commercially available from Basell Chemical Company); a PB copolymer such as Shell SRD4-141 (commercially available from Shell Chemical Company); and a EPB terpolymer such as Chisso XPM7800 (commercially available from Chisso Chemical Company).

Although the soft polymer content in the core layer may comprise up to about 40 weight percent of the core layer, preferably, the soft polymer comprises from about five percent up to about 40 percent by weight of the core layer, more preferably at least about 10 percent by weight of the core layer; and most preferably between about 10 and about 30 percent by weight of the core layer. Some embodiments may comprise from about five weight percent to about 15 weight percent of the soft polymer.

The core layer may further comprise at least one additive such as an opacifying agent, void-initiating particles, a hydrocarbon resin, or combinations thereof. Preferably, the total amount of additives in the core layer, other than the soft polymer, comprises up to about 20 percent by weight (20 wt. %) of the core layer but some embodiments may comprise additives in the core layer in an amount up to about 30 percent by weight of the core layer.

An opacifying or coloring agent may be used in the core layer, such oxide, carbon black, aluminum, titanium dioxide ($TiO_2$), talc, and combinations thereof.

Cavitating or void-initiating particles may be added to the core layer polymer to create an opaque film. The cavitating or void-initiating additives include any suitable organic or inorganic material that is incompatible with the core layer polymer material at the temperature of biaxial orientation. Examples of suitable void-initiating particles are polybutylene teraphthalate (PBT), nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 μm. These void initiating particles may be present in the core layer at less than 30 percent by weight; preferably less than 20 percent by weight; most preferably in the range of from 2-10 weight percent, based on the total weight of the core layer.

The core layer, the first tie layer and/or the optional second tie layer may include a hydrocarbon resin. Hydrocarbon resins may serve to enhance or modify the modulus, improve processability, or improve the barrier properties of the film. Examples of such hydrocarbon resins may be found in U.S. Pat. No. 5,667,902, incorporated herein by reference. The resin may be a low molecular weight hydrocarbon, which is compatible with the core polymer. Optionally, the resin may be hydrogenated. The resin may have a number average molecular weight greater than 5000; preferably greater than 2000; most preferably in the range of from 500-1000. The resin can be natural or synthetic and may have a softening point in the range of from 60°-180° C. (140°-356° F.). Examples of hydrocarbon resins include, but are not limited to, petroleum resins, terpene resins, styrene resins, and cyclopentadiene resins.

Examples of hydrocarbon resins that may be used include aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and mixtures of two or more thereof.

Hydrocarbon resins that may be suitable for use as described herein include EMPR 120, 104, 111, 106, 112, 115, EMFR 100 and 100A, ECR-373 and Escorez® 2101, 2203, 2520, 5380, 5600, 5618, 5690, available from ExxonMobil Chemical Company; ARKON™ M90, M100, M115 and M135 and SUPER ESTER™ rosin esters available from Arakawa Chemical Company of Japan; SYLVARES™ phenol modified styrene-a methyl styrene resins, styrenated terpene resins, ZONATAC terpend-aromatic resins, and terpene phenolic resins available from Arizona Chemical Company; SYLVATAC™ and SYLVALITE™ rosin esters available from Arizona Chemical Company; NORSOLENE™ aliphatic aromatic resins available from Cray Valley of France; DERTOPHENE™ terpene phenolic resins available from DRT Chemical Company of Landes, France; EASTOTAC™ resins, PICCOTAC™ $C_5/C_9$ resins, REGALITE™ and REGALREZ™ aromatic and REGALITE™ cycloaliphatic/aromatic resins available from Eastman Chemical Company of Kingsport, Tenn.; WINGTACK™ ET and EXTRA available from Goodyear Chemical Company, FORAL™, PENTALYN™, AND PERMALYN™ rosins and rosin esters available from Hercules (now Eastman Chemical Company); QUINTONE™ acid modified $C_5$ resins, $C_5/C_9$ resins, and acid modified $C_5/C_9$ resins available from Nippon Zeon of Japan; and LX™ mixed aromatic/cycloaliphatic resins available from Neville Chemical Company; CLEARON hydrogenated terpene aromatic resins available from Yasuhara; and Piccolyte. The preceding examples are illustrative only and by no means limiting.

One particular hydrocarbon resin may be referred to as a saturated alicyclic resin. Such resins, if used, may have a softening point in the range of from 85°-140° C. (185°-284° F.), or preferably in the range of 100°-140° C. (212°-284° F.),as measured by the ring and ball technique. Examples of commercially available saturated alicyclic resins are Arkon-P® (commercially available from Arakawa Forest Chemical Industries, Ltd., of Japan).

The amount of such hydrocarbon resins, either alone or in combination, in the core layer is less than 20 percent by weight; preferably in the range of from 1-5 percent by weight, based on the total weight of the core layer. Also, the core layer may comprise anti-static agents or migratory slip agents, such as fatty amides.

The core layer of embodiments of this invention preferably may have a thickness in the range of from about 5-50 μm; more preferably from about 5-25 μm; most preferably from 5-10 μm.

First Tie Layer

The first tie layer has a first side and a second side, the second side is on the first side of the core layer and is preferably contiguous to the surface of the first side of the core layer. The first tie layer comprises a soft polymer. In some preferred embodiments, the first tie layer comprises about 100 percent soft polymer by weight (100 wt %) of the first tie layer. Optionally, in other embodiments, the tie layer may also comprise a tie layer polymer. When the tie layer polymer is present, the tie layer polymer is preferably present in an amount of from at least about 25 percent by weight (25 wt %) to about 75 percent by weight of the tie layer. Amounts of the tie layer polymer of less than 25 weight percent are also permissible, depending upon the desired properties for the multi-layer film product. The optional tie layer polymer may comprise at least one of a $C_2$-$C_8$ alpha-olefin homo-, co-, or terpolymer or a metallocene catalyzed homo-, co-, terpolymer, metallocene catalyzed random copolymer, or blends thereof. Preferably, the first tie layer polymer is comprised of at least one of an iPP homopolymer, an EP copolymer, and blends thereof. The soft polymer of the tie layer comprises those polymers defined above as soft polymers.

The thickness of the first tie layer is typically in the range of from about 0.02 mil to about 1.0 mil (0.50-25 μm); preferably from about 0.02 mil to about 0.5 mil (0.50-12 μm); more preferably from about 0.02 mil to about 0.25 mil (0.50-6 μm), and most preferably from about 0.1 mil to about 0.2 mil (2.5 to 5 μm). Also, in some thinner films, the first tie layer thickness may be from about 0.02 mil to about 0.16 mil (0.5-4 μm); or from about 0.02 mil to about 0.08 mil (0.5-2 μm); or from about 0.02 mil to about 0.06 mil (0.5-1.5μm).

Sealant Layer

The sealant layer has a first side and a second side, the second side of the sealant layer is on the first side of the first tie layer. In preferred embodiments, the sealant layer is contiguous to the first tie layer. The sealant layer includes a polymer that is suitable for heat-sealing or bonding to itself when crimped between heated crimp-sealer jaws. Commonly, suitable sealable polymers include co- or terpolymers of ethylene, propylene, and butylene. In some preferred embodiments, the sealant layer comprises at least one polymer selected from the group consisting of Ziegler-Natta or metallocene catalyzed; polypropylene (PP) homopolymer, ethylene-propylene (EP) copolymer, propylene-butylene (PB) copolymer, an ethylene-butylene (EB) copolymer, ethylene-propylene-butylene (EPB) terpolymer, ethylene vinyl acetate (EVA), and blends thereof.

Heat sealable blends can be utilized in providing the sealant layer. Thus, along with the copolymer or terpolymer, there can be, for example, other polymers, such as polypropylene homopolymer, e.g., one which is the same as, or different from, the isotactic polypropylene of the core layer, or other material that does not impair the heat sealability of this layer. The sealant layer may additionally or alternatively include materials selected from one or more of ethylene propylene random copolymers (EP rcp), low density polyethylene (LDPE), linear low density polyethylene (LLDPE), medium density polyethylene (MDPE), or combinations thereof.

The thickness of the sealant layer is typically in the range of from about 0.10-7.0 μm; preferably about 0.10-4μm; and most preferably about 0.10-3 μm. In some film embodiments, the sealant layer thickness may be from about 0.10-2 μm; 0.10-1 μm; or 0.10-0.50 μm. In some commonly preferred film embodiments, the sealant layer has a thickness in the range of from about 0.5-2 μm, 0.5-3 μm, or 1-3.5 μm. The sealant layer may also comprise processing aid additives, such as anti-blocks, anti-stats, and slip agents.

Outer Skin Layer

An outer skin layer is an optional layer and when present is provided on the opposite side of the core layer from the sealant layer. The outer skin layer has a first side and a second side, the first side of the outer skin layer is on the second side of the core layer and may be contiguous to the second side of the core layer or contiguous to one or more tie layers positioned between the core layer and the outer skin layer. The outer skin layer may be provided to improve the film's barrier properties, processability, printability, and compatibility for metallization, coating, and lamination to other films or substrates.

The outer skin layer comprises at least one polymer selected from the group consisting of a PE polymer, a PP polymer, an EP copolymer, an EPB terpolymer, an ethylene-vinyl alcohol (EVOH) polymer, and blends thereof. Preferably, the PE polymer is high-density polyethylene, such as HDPE, such as M-6211 and HDPE M-6030 (commercially available from Equistar Chemical Company); and HD-6704.67 (commercially available from ExxonMobil Chemical Company); and preferably the PP polymer is an EP copolymer, such as Fina 8573 (commercially available from Fina Oil Company). For coating and printing functions, the outer skin layer may preferably comprise a co- or terpolymer that has been surface treated. For metallizing or barrier properties, a HDPE, PP or EVOH may be preferred. A suitable EVOH copolymer is Eval G176B (commercially available from Kuraray Company Ltd. of Japan).

The thickness of the outer skin layer depends upon the intended function of the skin layer, but is typically in the range of from about 0.50-3.5 µm; preferably from about 0.50-2 µm; and in many embodiments most preferably from about 0.50-1.5 µm. Also, in thinner film embodiments, the outer skin layer thickness may range from about 0.50-1.0 µm; or 0.50-0.75 or is about 0.50 µm.

Second Tie Layer

In some embodiments of the multi-layer films invention, an optional second tie layer is located between the core layer and the outer skin layer. Such second tie layer has a first side that is contiguous to the second side of the core layer and a second side that is contiguous to the first side of the outer skin layer. In one embodiment, the second tie layer comprises a polymer blend of propylene homopolymer polymer and, optionally, at least one soft polymer (described above), and the blends thereof. The propylene polymer is preferably an iPP. Preferably, a soft polymer comprises up to 90 percent by weight of the second tie layer, more preferably at least 10 percent by weight of the second tie layer, and most preferably between 10 and 90 percent by weight of the second tie layer. In some preferred embodiments, the outer skin layer is an adhesion promoting material, such as Admer AT 1179A (commercially available from Mitsui Chemicals America Inc.), a maleic anhydride modified polypropylene.

The thickness of the second tie layer is in the range of from about 1-25 µm; preferably from about 1-12 µm; and most preferably from about 1-10 µm. Also, the thickness may be from about 0.5-8 µm; or 1-6 µm; or 1-4 µm.

Coating

In some embodiments, one or more coatings, such as for barrier, printing and/or processing, may be applied to the outer skin layer of the multi-layer films of this invention. Such coatings may include acrylic polymers, such as ethylene acrylic acid (EAA), ethylene methyl acrylate copolymers (EMA), polyvinylidene chloride (PVDC), poly(vinyl)alcohol (PVOH) and ethylene (vinyl)alcohol EVOH. The coatings are preferably applied by an emulsion coating technique, but may also be applied by co-extrusion and/or lamination.

The PVDC coatings that are suitable for use with the multi-layer films of this invention are any of the known PVDC compositions heretofore employed as coatings in film manufacturing operations, e.g., any of the PVDC materials described in U.S. Pat. Nos. 4,214,039; 4,447,494; 4,961,992; 5,019,447; and 5,057,177, incorporated herein by reference.

Known vinyl alcohol-based coatings, such as PVOH and EVOH, that are suitable for use with the multi-layer films invention include VINOL 125 or VINOL 325 (both commercially available from Air Products, Inc.). Other PVOH coatings are described in U.S. Pat. No. 5,230,963, incorporated herein by reference.

Before applying the coating composition to the appropriate substrate, the upper surface of the film may be treated as noted herein to increase its surface energy. This treatment can be accomplished by employing known techniques, such as, flame treatment, plasma, corona discharge, film chlorination, i.e., exposure of the film surface to gaseous chlorine, treatment with oxidizing agents such as chromic acid, hot air or steam treatment, flame treatment and the like. Although any of these techniques is effectively employed to pre-treat the film surface, a frequently preferred method is corona discharge, an electronic treatment method which includes exposing the film surface to a high voltage corona discharge while passing the film between a pair of spaced electrodes. After treatment of the film surface, the coating composition is then applied thereto.

An intermediate primer coating may be applied to multi-layer films of this invention. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy and poly(ethylene imine) (PEI) materials. U.S. Pat. No. 3,753,769 to Steiner; U.S. Pat. No. 4,058,645 to Steiner; and U.S. Pat. No. 4,439,493 to Hein et al., each incorporated herein by reference, disclose the use and application of such primers. The primer provides an overall adhesively active surface for thorough and secure bonding with the subsequently applied coating composition and can be applied to the film by conventional solution coating means, for example, by roller application.

The coating composition can be applied to the film as a solution, one prepared with an organic solvent such as an alcohol, ketone, ester, and the like. However, since the coating composition can contain insoluble, finely divided inorganic materials which may be difficult to keep well dispersed in organic solvents, it is preferable that the coating composition be applied to the treated surface in any convenient manner, such as by gravure coating, roll coating, dipping, spraying, and the like. The excess aqueous solution can be removed by squeeze rolls, doctor knives, and the like.

The film can be stretched in the machine direction, coated with the coating composition and then stretched perpendicularly in the transverse direction.

In yet another embodiment, the coating can be carried out after biaxial orientation is completed.

The coating composition may be applied in such amount that there will be deposited upon drying a smooth, evenly distributed layer, generally on the order of from 0.2-5 µm thickness (equivalent to 0.2-3.5 g per 1000 sq. in. of film). The coating on the film may subsequently be dried by hot air, radiant heat, or by any other convenient means.

Film Orientation

The embodiments of this invention include possible uniaxial or biaxial orientation of the multi-layer films. Orientation in the direction of extrusion is known as machine direction orientation (MD), orientation perpendicular to direction of extrusion is known as transverse direction (TD). Orientation may be accomplished by stretching or pulling a blown film in the MD, using a blow-up ratio to accomplish TD orientation. Blown films or cast films may also be oriented by a tenter-frame orientation subsequent to the film extrusion process, again in one or both directions. Orientation may be sequential or simultaneous, depending upon the desired film features. Orientation ratios may generally be in the range of 1:3-1:6 in the machine direction (MD) or 1:4-1:10 in the transverse direction (TD). Preferred orientation ratios are commonly from between about three to about six times the extruded width in the machine direction and between about four to about ten times the extruded width in the transverse direction.

Surface Treatment

One or more of the surfaces of the outer layers of the multi-layer films of this invention may be surface-treated to increase the surface energy to render the film receptive to metallization, coatings, printing inks, and/or lamination. The surface treatment can be carried out according to one of the methods known in the art. Methods that include, corona discharge, flame, plasma, chemical treatment, or treatment by means of a polarized flame.

Metallization

The exterior surface of one or more of the outer skin layers and/or the sealant layer (or the core layer if no outer skin layer is present) may be metallized. Such layers may be metallized using conventional methods, such as vacuum metallization by deposition of a metal layer such as aluminum, copper, silver, chromium, or mixtures thereof.

Other Additives

Other additives that may be added to the multi-layer films of this invention, include, but are not limited to, pigments, colorants, anti-oxidants, anti-ozonants, anti-fogs, anti-stats, fillers such as diatomaceous earth, combinations thereof, and the like. Such additives may be used in effective amounts, which vary depending upon the property required, and are, typically selected from one or more of anti-block, slip additive, anti-oxidant additive, moisture barrier additive or gas barrier additive.

Useful anti-static additives that may be used in amounts ranging from about 0.05 to 3 weight percent, based upon the weight of the layer, include alkali metal sulfonates, polyether-modified polydiorganosiloxanes, polyalkylphenylsiloxanes, and tertiary amines.

Anti-blocking agents, such as a silica-based product such as Sylobloc 44 (commercially available from Grace Davison Products); polymethyl methacrylate (PMMA) particles such as EPOSTAR™; or polysiloxanes such as TOSPEARL™ are also contemplated. Such anti-blocking agents comprise an effective amount up to about 3000 ppm of the weight of the layer to which it is added.

Conventional slip additives include higher aliphatic acid amides, higher aliphatic acid esters, waxes, silicone oils, and metal soaps. Such slip additives may be used in amounts ranging from 0.1-2 weight percent based on the total weight of the layer to which it is added. An example of a slip additive that may be useful for this invention is erucamide.

The sealant layer and/or the outer skin layer may also include a non-migratory slip agent, such as polymethyl methacrylate (PMMA). The non-migratory slip agent may have a (mean) particle size in the range of from about 0.5-4 µm, or more preferably 0.5-8 µm, or 1-5 µm, or 2-4 µm, depending upon layer thickness and desired slip properties. Alternatively, the size of the particles in the non-migratory slip agent, such as PMMA, may be greater than 20% of the thickness of the sealant or outer skin layer containing the slip agent, or greater than 40% of the thickness of the layer, or greater than 50% of the thickness of the layer. The size of the particles of such non-migratory slip agent may also be at least 10% greater than the thickness of the sealant or outer skin layer, or at least 20% greater than the thickness of the sealant or outer skin layer, or at least 40% greater than the thickness of the sealant or outer skin layer. Generally spherical, particulate non-migratory slip additives are contemplated, including PMMA resins, such as EPOSTAR™, manufactured by Nippon Shokubai Co., Ltd. Other commercial sources of suitable materials are also known to exist. Non-migratory means that these particulates do not generally change location throughout the layers of the film in the manner of the migratory slip agents.

A conventional polydialkyl siloxane, such as silicone oil or gum additive having a viscosity of 10,000-2,000,000 centistokes is also contemplated.

Useful anti-oxidants are phenolic anti-oxidants, such as Irganox 1010 (commercially available from Ciba-Geigy Company). Such anti-oxidants are generally used in amounts ranging from 0.1-2 weight percent, based on the total weight of the layer to which it is added.

Barrier additives may be used in effective amounts and may include low-molecular weight resins, hydrocarbon resins, particularly petroleum resins, styrene resins, cyclopentadiene resins, and terpene resins.

Optionally, the skin layers may be compounded with a wax or coated with a wax-containing coating, for lubricity, in amounts ranging from 2-15 weight percent based on the total weight of the layer to which it is added. Any conventional wax, such as, but not limited to, Camauba™ wax (available from Michelman Corporation, Cincinnati, Ohio) that is useful in thermoplastic films is contemplated.

Heat Seals

Heat seals useful in packaging are commonly lap, fin, or crimp seals. Most frequently, vertical form fill and seal and/or horizontal form fill and seal (VFFS and/or HFFS, respectively) useful in snack packaging will employ a fin seal and two crimp seals. For extended shelf life, a hermetic seal is desirable. A hermetic seal is generally one that does not permit the passage of a gas.

Methods and Uses

Multi-layer Films according to the present invention are useful as substantially stand-alone film webs or they may be coated, metallized, and/or laminated to other film structures. Multi-layer films according to the present invention may be prepared by any suitable methods comprise the steps of co-extruding a multi-layer film according to the description and claims of this specification, orienting and preparing the film for intended use such as by coating, printing, slitting, or other converting methods. Preferred methods comprise co-extruding, then casting and orienting, or blowing a five-layer film, such as illustrated and discussed in the examples and in this specification.

A method of preparing a multi-layer film according to the present invention comprises the steps of co-extruding at least:
  a core layer having a first side and a second side, said core layer comprising a core polymer and at least one soft polymer;
  a first tie layer having a first side and a second side, the second side of the first tie layer on the first side of said core layer, said first tie layer comprising a soft polymer and, optionally, a tie layer polymer, the optional tie layer polymer comprising at least one of a $C_2$-$C_8$ alpha-olefin homo-, co-, or terpolymer, a metallocene catalyzed homo-, co-, or terpolymer comprising propylene, and blends thereof; and
  a sealant layer on the first side of the first tie layer.

The method may further comprise the steps of: enclosing a product or article within at least a portion of the co-extruded film; engaging a first portion of the sealant layer with a second portion of the sealant layer at a seal area; and applying pressure and heat at the seal area, optionally for a determined duration of time, to cause the first portion to engage with the second portion to create at least one of a fin seal, a lap seal, and a crimp seal in the seal area.

The method may further comprise additionally co-extruding a second tie layer and an outer skin layer on a side of the core layer opposite the sealant layer with the core layer, the first tie layer, and the sealant layer.

The prepared multi-layer film may be used as a flexible packaging film, such as to package an article or good, such as a food item or other product. In some applications, the film may be formed into a pouch type of package, such as may be useful for packaging a beverage, liquid, granular, or dry-powder product.

Property Measurement

Seal strength is a measure of the force required to separate a test strip of a material containing a seal and identifies the mode of failure of the test strip. The seal strength is performed on an untreated surface that is sealed to itself.

Minimum seal temperature is a measure of the sealing property of a film and is the temperature at which a heat seal may support a given force.

Puncture resistance is a measure of the amount of force required to penetrate a film using a probe of a specified diameter.

Testing Methods

Seal strength may be determined using sealing devices such as a WRAPADE (™) Crimp Sealer (Model J or K), ASKCO (™) Heat Sealer (Model HST-09), and a LAKO (™) Heat Sealer (Model SL-10). Also, the seal strength of flexible barrier materials may be determined according to the standard testing method of ASTM F 88-00.

The seal strength of a seal formed using the WRAPADE Crimp Sealer (Model J or K), commercially available from Wrapade Machine Co., Inc. of Clifton, N.J. is determined as follows: The WRAPADE crimp sealer is set to a dial pressure of about 20 psi (138 kPa), dwell time of 0.75 seconds. A multi-layer film specimen is prepared so that when two surfaces are placed together the resulting film is approximately 6.35 cm in the transverse direction by 7.62 cm in the machine direction. The specimen is then inserted squarely, smoothly, and flatly into the crimp sealer jaws so that a small amount protrudes beyond the back end of the jaws. The transverse direction of the specimen is parallel to the sealer jaws. The jaws are closed and immediately after the sealing bar rises the specimen is removed from the jaws of the sealer. A JDC-1-12 cutter (commercially available from Thwing Albert Instrument of Philadelphia, Pa.) is used to cut the specimen into a one inch strip. The amount of force needed to separate the seal is determined on an Alfred-Suter seal strength testing unit. The amount of force needed to pull the seal apart is recorded in grams per inch as the seal strength.

The seal strength of a seal formed using an ASKCO Heat Sealer (Model HST-09), commercially available from Askco Instrument Corp. of Houston, Tex. is determined as follows: The ASKO Heat Sealer is comprised of a multiple bar sealer having a pressure of up to 22 psi, a dwell time of 2 seconds, at a temperature that ranges from 200° F. to 280° F. To form a seal, a film sample is placed in the jaws of the sealer such that the desired surfaces are together (i.e., inside to inside or outside to outside). A seal is formed, for example, when the jaws are heated to a sealing temperature and then closed together at a seal pressure of 5 psi and a dwell time of 2 seconds. The seal strength is determined using the Alfred-Suter tester as noted above.

A LAKO (™) Heat Sealer (Model SL-10), commercially available from Lako Tool & Manufacturing, Inc. of Perrysburg, Ohio, may be used to form a seal and evaluate its seal strength. The LAKO Heat Sealer is an automated film testing device which is capable for forming a film seal, determining the seal strength, and generating a seal profile from film samples. The operating range is from ambient to 390° F. (199° C.), sealing pressure of 6.5-390 psi, and a dwell time of 0.2-20 sec.

The minimum seal temperature is determined as follows: Heat seals are formed using one of the above heat sealers at temperatures that are raised incrementally. The minimum seal temperature is reached when one temperature yields a seal value of less then a specified grams/inch peel force and the next temperature yields a seal value of greater than or equal to the specified grams/inch peel force. In the case of the WESTADE Crimp Sealer, the specified peel force is 200 grams per inch. With respect to the ASKCO Heat Sealer and the LASKO Heat Sealer, the specified peel force is 100 grams per inch.

The puncture resistance of a film may be determined using a Sintech Tensile Testing Unit with a 50 pound Load Cell (commercially available from MTS Systems Corporation of Eden Prairie, Minn.). Puncture resistance is determined as follows: Using the Sintech Tensile Testing Unit a probe of a specified diameter is used to puncture a film specimen that has been in the load cell. The force required to puncture the film and the resulting displacement is recorded as a measure of puncture resistance.

EXPERIMENTAL

The multi-layer film of the present invention will be further described with reference to the following non-limiting examples. All weight percentages specified herein are based on the weight of the respective film layer, unless specified otherwise.

Example 1

Control

An opaque, oriented, five-layer film having an A/B/C/D/E structure is prepared as a control film. The A layer is an outer skin layer (4 ga.) comprising an EVOH polymer (Eval G176B from Kuraray Company Ltd. of Japan). The B layer is a tie layer (12 ga.) comprising 50 weight percent of an adhesive resin (Admer AT1179A) and 50 weight percent of Fina 3371 isotactic polypropylene homopolymer resin (Fina 3371 from AtoFina Chemical). The C layer is a core layer comprising 90 weight percent of an isotactic polypropylene homopolymer (Fina 3371 from Fina Oil) and 10 weight percent PBT cavitating agent. The D layer is a tie layer (12 ga.) comprising 100 weight percent Fina 3371. The E layer is a sealant layer (5 ga.) comprising an EPB terpolymer (Chisso XPM7794 from Chisso Company). This film has a target polygauge thickness of 0.9 mil and a 1.1. mil target optical gauge and is illustrated in FIG. 1.

Example 2

Control

Figure 2:
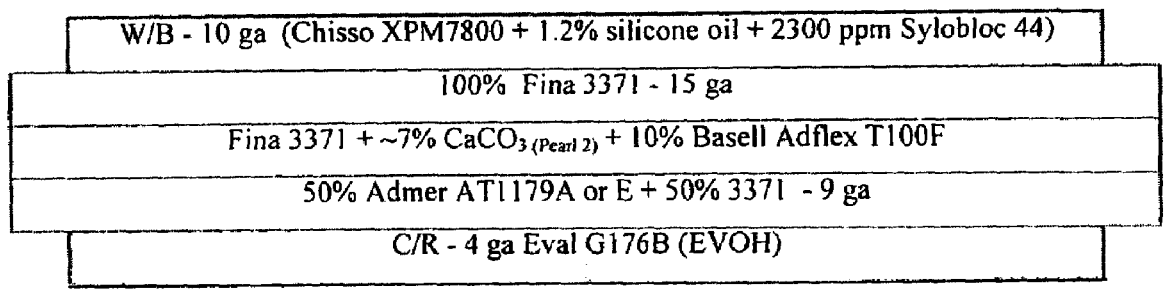
FIG. 2 illustrates an example of a control film structure.

An opaque, oriented, five-layer film having an A/B/C/D/E structure is prepared according to an embodiment of the present invention. The A layer is an outer skin layer (4 ga.) comprising an EVOH polymer (Eval G176B from Kuraray Company Ltd. of Japan). The B layer is a second tie layer (9 ga.) comprising 50 weight percent of an adhesive resin (Admer AT 1179A) and 50 weight percent of 3371 isotactic polypropylene homopolymer resin (Fina 3371 from AtoFina Chemical). The C layer is a core layer comprised of about 83 weight percent Fina 3371, 10 percent soft polymer (Adflex T100F "Cataloy™," an EP copolymer having a relatively high elastomer content, from Basell Company), and 10 weight percent calcium carbonate. The D layer is a first tie layer (15 ga.) comprising 100 percent Fina 3371. The E layer is a sealant layer (10 ga.) comprising an EPB terpolymer (Chisso XPM7800 from Chisso Company) and 1.2 weight percent silicone oil (migratory slip agent) and 2300 ppmw of an anti-blocking agent (Sylobloc 44 from Grace Davison Products) processing additive. This film has a 0.9 mil polygauge target and a 1.1 mil optical gauge target and is illustrated in FIG. 2. Thus, the C layer (core layer) and the D layer (first tie layer) differ from those in Example 1. This control example demonstrates that the presence of the soft polymer in the core layer does provide some improvement in seal strength over the film of Example 1.

Example 3

Figure 3:
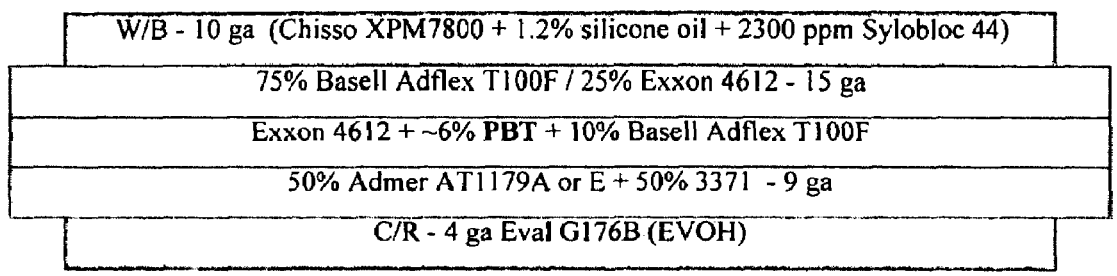
FIG. 3 illustrates an example of a film structure according to the present invention.

An opaque, oriented, five-layer film having an A/B/C/D/E structure, illustrated in FIG. 3, is prepared according to an embodiment of the present invention. The A layer is an outer skin layer (4 ga.) comprising Eval G176B (EVOH). The B layer is a tie layer (12 ga.) comprising 50 weight percent of an adhesive resin (Admer AT1179A, from Mitsui Polymers) and 50 weight percent of Fina 3371. The C layer is a core layer comprised of about 84 weight percent Exxon 4612 PP, about 10 weight percent Adflex T100F Catalloy™ EP copolymer, and about 6 weight percent calcium carbonate as a cavitating agent. The D layer is a tie layer (15 ga.) comprising 25 weight percent Exxon 4612 and 75 weight percent Basell Adflex T100F. The E layer is a sealant layer (10 ga.) comprising Chisso XPM7800 EPB terpolymer from Chisso Company, 1.2 weight percent silicone oil, and 2300 ppmw Sylobloc 44. This film has a 0.9 mil polygauge target and a 1.1 mil optical gauge target. Thus, the C layer (core layer) and D layer (first tie layer) differ from that in Control Examples 1 and 2 in that layers C and D each include a soft polymer.

The results of the evaluation of the multi-layer films of Examples 1, 2, and 3 are shown in Table I.

ing titanium dioxide (TiO$_2$). (Each of the TiO$_2$-containing masterbatches referenced in this document comprises approximately 50 weight percent TiO$_2$ and about fifty weight percent of polypropylene polymer and related additives.) The C layer is a core layer comprising Exxon 4612 propylene polymer and about 6 weight percent PBT (GE Valox 295) cavitating agent. The D layer is a tie layer (12 ga.) comprising Fina 3371. The E layer is a sealant layer (10 ga.) comprising Chisso XPM7800 EPB terpolymer in addition to 1.2 weight percent silicone oil and 2300 ppmw of Sylobloc 44. This film has a 4.2:1 machine direction orientation (MDX), a 2.00 mil polygauge target and a 2.70 mil optical gauge target.

Example 5

A white, oriented five-layer film having an A/B/C/D/E structure is prepared according to the present invention. The A layer is an outer skin layer (3 ga.) comprising a high density polyethylene (M6030 from Equistar, including stabilizers and processing aids) and is corona treated at greater than 42 dynes. The B layer is a tie layer (12 ga.) comprising about 92 weight percent Fina 3371 and 8 weight percent of Ampacet 511094, a masterbatch containing about 50 weight percent polypropylene and about 50 weight percent titanium dioxide (TiO$_2$). The C layer is a core layer comprising about 79 weight percent of Exxon 4612 isotactic polypropylene, 15 weight percent soft polymer (Adflex 7353XEP from Basell Company), and about 6 weight percent PBT. The D layer is a tie layer (12 ga.) comprising 75 weight percent Adflex 7353XEP and 25 weight percent Fina 3371 polypropylene. The E layer is a sealant layer (10 ga.) comprising Chisso XPM7800 terpolymer in addition to 1.2 weight percent sili-

TABLE I

| Example | Min. Seal Temperature @ 100 gm ASKCO Sealer 5 psi, 2 sec. dwell time | Seal Strength @ 230° F. ASKCO Sealer 5 psi, 2 sec. dwell time | Min. Seal Temperature @ 200 gm WRAPADE Crimp Sealer 20 psi, 0.75 sec. dwell time | Seal Strength @ 190° F. WRAPADE Crimp Sealer 20 psi, 0.75 sec. dwell time | Min. Seal Temperature @ 200 gm LAKO Sealer 60 psi, 0.75 sec. dwell time | Seal Strength @ 210° F. LAKO Sealer 60 psi, 0.75 sec. dwell time |
|---|---|---|---|---|---|---|
| Example 1 (Control) | 224.2° F. | 210 gm/in | 188.5° F. | 225 gm/in | 195.2° F. | 420 gm/in |
| Example 2 (Control) | 220.3° F. | 255 gm/in | 183.6° F. | 318 gm/in | 191.9° F. | 520 gm/in |
| Example 3 | 203.3° F. | 540 gm/in | 178.8° F. | 545 gm/in | 183.8° F. | 836 gm/in |

As shown in Table I, the addition of soft polymer to the C core layer and D first tie layer in Example 3 results in lower minimum sealing temperatures and higher seal strengths as compared to the control films.

Examples 4 through 7 pertain to relatively thicker films than Examples 1 through 3.

Example 4

Control

Figure 4:
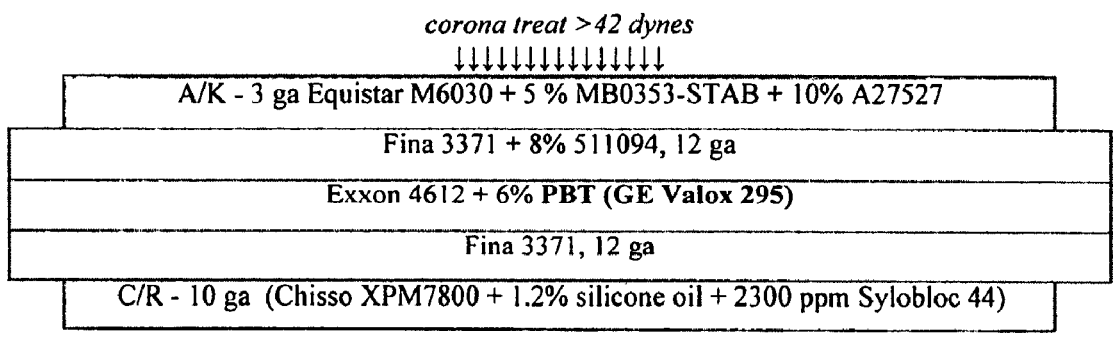
FIG. 4 illustrates an example of a control film structure.
Figure 5:
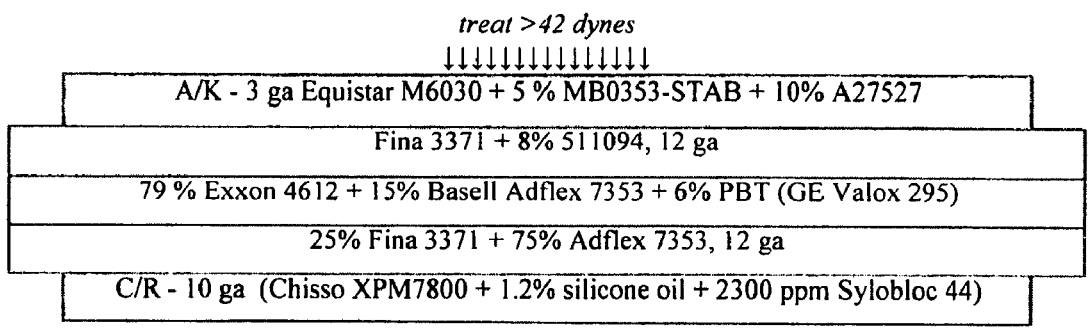
FIG. 5 illustrates an example of a film structure according to the present invention.
Figure 6:
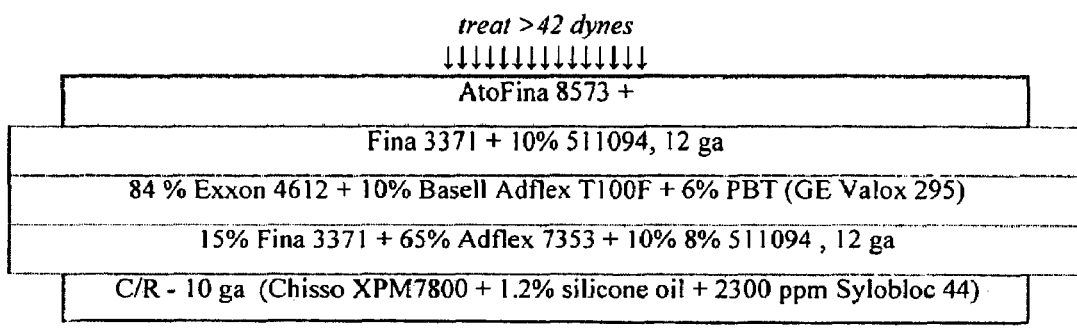
FIG. 6 illustrates an example of a film structure according to the present invention.

A white, oriented five-layer film having an A/B/C/D/E structure, as illustrated in FIG. 4, is prepared. The A layer is an outer skin layer (3 ga.) comprising an HDPE (M6030) from Equistar with stabilizers and processing aids and is corona treated to a surface energy of at least 42 dynes. The B layer is a tie layer (12 ga.) comprising about 92 weight percent Fina 3371 and 8 weight percent of a polymer masterbatch containcone oil and 2300 ppmw of Sylobloc 44. This film has a 4.2:1 machine direction orientation (MDX), a 2.00 mil polygauge target and a 2.70 mil optical gauge target.

Example 6

A white, oriented, five-layer film having an A/B/C/D/E structure is prepared according to an embodiment of the present invention. The A layer is an outer skin layer (3 ga.) comprising Fina 8573HB EP copolymer from AtoFina polymers. The B layer is a tie layer (12 ga.) comprising about 90 weight percent Fina 3371 and 10 weight percent of masterbatch containing titanium dioxide (TiO$_2$). The C layer is a core layer comprising about 84 weight percent of Exxon 4612, 10 weight percent of Adflex T100F and about 6 weight percent PBT. The D layer is a tie layer (12 ga.) comprising 65 weight percent of Adflex T100F, 15 weight percent Fina 3371, and 10 weight percent of masterbatch containing titanium dioxide (TiO$_2$). The E layer is a sealant layer (10 ga.) comprising Chisso XPM7800, 1.2 weight percent silicone oil, and 2300 ppmw of Sylobloc 44. This film has a 4.2:1 MDX, a 2.00 mil polygauge target, and a 2.70 mil optical gauge target.

The results of the evaluation of the multi-layer films of Examples 4, 5, and 6 are shown in Table II.

TABLE II

| Example | Minimum Seal Temperature @ 200 gm WRAPADE Crimp Sealer 20 psi, 0.75 sec. Dwell time | Seal Strength @ Temperature (° F.) WRAPADE Crimp Sealer 20 psi, 0.75 sec. dwell time |
|---|---|---|
| Example 4 (Control) | 170.6° F. | 620 @ 180° F. gm/in |
| Example 5 | 164.3° F. | 1373 gm/in @ 180° C. |
| Example 6 | 163° F. | 1107 gm/in @ 190° F. |

As shown in Table II, the addition of a soft polymer to the C layer (core layer) and the D layer (tie layer) provides substantial seal strength improvement over the control samples. Additionally, the addition of the soft polymer effectively reduced the minimum seal temperature. Note also that Control Example 4 reflects improved seal strength relative to Control Example 1. This is due in large part to the greater sealant layer thickness and greater core layer thickness in Example 4.

Table III below provides additional experimental test data for a number of five-layer film embodiments according to the present invention. Each embodiment is represented by a Sample No., and the corresponding description of the polymer resin components in each of a core layer, the first tie layer, and sealant layer is provided in Table III. The target thickness for each of the produced five layer films is 0.90 mil or 90 gauge units. Layer thickness for the sealant skin layer and the tie layer are provided in the table with the balance of the thickness provided by the core layer, the second tie layer, and the outer skin layer. Layer thickness is provided in gauge units, with 100 gauge units equal to one mil., which is roughly equal to 25.4 micrometers. Percentages are weight percents based upon the component weight in the respective layer. Seal strength measurements represent the average seal strength, in grams per inch of seal, from a crimp seal that was made using a WRAP-ADE crimp sealer with a Brugger profile, 20 psi pressure, and 0.75 seconds of dwell time. Minimum seal temperature (MST) is the average minimum seal temperature required to effect a seal strength of 200 grams per inch with a crimp seal applied at 20 psi of pressure and 0.75 seconds of dwell time.

The core layer base resins that were tested include Exxon 4712, an isotactic polypropylene homopolymer available from ExxonMobil Chemical, and Fina 3371, a polypropylene homopolymer available from AtoFina Chemical that is less isotactic than the Exxon 4712. The core layer comprises a blend of the listed base resin plus the stated weight percentage of the indicated soft polymer. Two embodiments of the sealant skin layer were tested as disclosed in Table III. One embodiment comprises an EPB terpolymer, (Chisso XPM7800, from Chisso Resins), plus 1.2% silicone oil plus 2300 ppmw of Sylobloc 44. The other sealant skin embodiment comprises the same components as the first embodiment with the addition of about 25 weight percent of an ethylene vinyl acetate copolymer (EVA), Escorene LD-708 available from ExxonMobil Chemical. The tie layer embodiments comprise substantially 100 weight percent of the soft resin as stated in the table under the heading "Tie Layer Resin." The tested soft resins include Adflex 7353XEP (T100F), an EP copolymer from Basell Polymers, and FINAPLAS-1471, a syndiotactic polypropylene copolymer from AtoFina Chemical, having a lower crystallinity and narrower molecular weight distribution than many isotactic polypropylenes. The second skin layer in each sample comprises Fina 8573 a polypropylene copolymer from AtoFina that has been flame treated to a target surface energy of 40 dynes. The second tie layer comprises the same base polymer as the core layer, namely either the Fina 3371 or the Exxon 4712.

In addition to the samples in Table III that comprise a soft resin in both the core layer and the first tie layer, one reference sample was produced, Sample No. A, that includes soft resin blended in the core layer but having a first tie layer comprising Fina 3371 polypropylene with no soft resin in the first tie layer.

TABLE III

| Sample No. | Test Reference No. | Core layer Polymer | Skin Thickness | EVA in Terpolymer Skin? | Soft polymer in Core | Soft polymer Wt % in Core | First Tie layer Soft Polymer (100%) | Tie layer Thickness | Seal Strength @ 180° F. | Seal Strength @ 200° F. | Seal Strength @ 220° F. | Min. Seal Temp ° F. @ 200 gm |
|---|---|---|---|---|---|---|---|---|---|---|---|---|
| A (Control) | 0 | 3371 | 10 | EVA | Adflex 7353 | 30 | 3371 | n.a. | 190 | 500 | 815 | 180 |
| B | 4 | 4712 | 7 | EVA | Adflex 7353 | 10 | Adflex 7353 | 12 | 340 | 870 | 1330 | 175 |
| C | 10 | 4712 | 11 | EVA | Adflex 7353 | 30 | Adflex 7353 | 6 | 398 | 1150 | 1395 | 174 |
| D | 1 | 3371 | 11 | EVA | FINAPLAS-1471 | 10 | Adflex 7353 | 12 | 395 | 1130 | 1690 | 174 |
| E | 3 | 4712 | 11 | EVA | FINAPLAS-1471 | 30 | Adflex 7353 | 12 | 300 | 1100 | 1440 | 176 |
| F | 17 | 3371 | 11 | EVA | FINAPLAS-1471 | 10 | Adflex 7353 | 12 | 488 | 1180 | 1720 | 173 |
| G | 7 | 4712 | 7 | EVA | FINAPLAS-1471 | 10 | Adflex 7353 | 6 | 315 | 860 | 1160 | 175 |
| H | 12 | 4712 | 7 | EVA | Adflex 7353 | 30 | FINAPLAS-1471 | 6 | 40 | 640 | 1240 | 192 |
| I | 6 | 4712 | 7 | EVA | FINAPLAS-1471 | 30 | FINAPLAS-1471 | 12 | 48 | 370 | 1700 | 194 |
| J | 13 | 4712 | 11 | EVA | FINAPLAS-1471 | 10 | FINAPLAS-1471 | 6 | 45 | 740 | 1450 | 190 |
| K | 9 | 3371 | 7 | No EVA | Adflex 7353 | 30 | Adflex 7353 | 12 | 643 | 1480 | 2190 | 172 |
| L | 11 | 3371 | 11 | No EVA | Adflex 7353 | 10 | Adflex 7353 | 6 | 543 | 1160 | 1720 | 172 |
| M | 8 | 3371 | 7 | No EVA | FINAPLAS-1471 | 30 | Adflex 7353 | 6 | 288 | 1120 | 1895 | 176 |
| N | 15 | 3371 | 11 | No EVA | FINAPLAS-1471 | 10 | Adflex 7353 | 12 | 575 | 1390 | 2250 | 173 |
| O | 14 | 3371 | 11 | No EVA | Adflex 7353 | 30 | FINAPLAS-1471 | 12 | 55 | 1410 | 1520 | 191 |
| P | 16 | 3371 | 7 | No EVA | Adflex 7353 | 10 | FINAPLAS-1471 | 6 | 38 | 450 | 600 | 193 |

TABLE III-continued

| Sample No. | Test Reference No. | Core layer Polymer | Skin Thickness | EVA in Ter-polymer Skin? | Soft polymer in Core | Soft polymer Wt % in Core | First Tie layer Soft Polymer (100%) | Tie layer Thickness | Seal Strength @ 180° F. | Seal Strength @ 200° F. | Seal Strength @ 220° F. | Min. Seal Temp ° F. @ 200 gm |
|---|---|---|---|---|---|---|---|---|---|---|---|---|
| Q | 5 | 3371 | 7 | No EVA | FINAPLAS-1471 | 10 | FINAPLAS-1471 | 12 | 45 | 300 | 1040 | 196 |
| R | 2 | 4712 | 11 | No EVA | FINAPLAS-1471 | 30 | FINAPLAS-1471 | 6 | 50 | 600 | 1060 | 192 |
| S | 18 | 4712 | 11 | No EVA | FINAPLAS-1471 | 30 | FINAPLAS-1471 | 6 | 48 | 720 | 1010 | 191 |

The data in Table III demonstrates that the softer resin components provided in the core and tie layer can improve seal strength and can, in some embodiments, reduce the MST, relative to a film comprising more crystalline polymers in the core and tie layers.

The present invention is described herein with reference to embodiments of multi-layer films having layers containing polymer blends comprised of one or more soft polymers with one or more tie layers comprising soft polymers, however, other various film structures are contemplated. Those skilled in the art will appreciate that numerous modifications to these embodiments may be made without departing from the scope of our invention. For example, while certain film layers are exemplified as being comprised of specific polymer blends and additives, along with certain arrangement of layers within the film, other compositions and arrangements are also contemplated. Additionally, while packaging is discussed as among the uses for embodiments of our inventive films, other uses, such as labeling and printing, are also contemplated.

To the extent that this description is specific, it is solely for the purpose of illustrating certain embodiments of the invention and should not be taken as limiting the present inventive concepts to these specific embodiments. Therefore, the spirit and scope of the appended claims should not be limited to the description of the embodiments contained herein.

We claim:

1. A multi-layer film, comprising:
   (a) a core layer having a first side and a second side, said core layer comprising a core polymer and at least one soft polymer;
   (b) a first tie layer having a first side and a second side, the second side of the first tie layer on the first side of said core layer, said first tie layer comprising a soft polymer and, optionally, a tie layer polymer, the optional tie layer polymer comprising at least one of a $C_2$-$C_8$ alpha-olefin homo-, co-, or terpolymer, a metallocene catalyzed homo-, co-, or terpolymer comprising propylene, and blends thereof; and
   (c) a sealant layer on the first side of the first tie layer, wherein the soft polymer of at least one of the first tie layer and the core layer comprises a polymer having a flexural modulus of less than or equal to about 80 Kpsi and a Vicat softening point of less than or equal to about 221° F. (105° C.), wherein a seal formed by a crimp sealer of 200 gram/in weight, 20 psi pressure and 0.75 sec dwell time of said sealant layer to itself has a minimum seal temperature of less than or equal to about 180° F. (82.2° C.).

2. The multi-layer film of claim 1, wherein the seal of the sealant layer to itself has a seal strength of greater than about 600 grams per inch for a seal formed on the crimp sealer at a temperature of at least 200° F. (93.3° C.).

3. The multi-layer film of claim 1, wherein the soft polymer of the core layer comprises between about five percent by weight and about 40 percent by weight of said core layer.

4. The multi-layer film of claim 1, wherein the soft polymer of the core layer comprises between about 10 percent by weight and about 30 percent by weight of said core layer.

5. The multi-layer film of claim 1, wherein the core polymer comprises propylene.

6. The multi-layer film of claim 1, wherein the soft polymer of the first tie layer comprises at least about 25 percent by weight of the first tie layer.

7. The multi-layer film of claim 1, wherein the soft polymer of at least one of the first tie layer and the core layer comprises a polymer having a melting point temperature of less than or equal to about 288° F. (142° C.).

8. The multi-layer film of claim 1, wherein the soft polymer of at least one of the first tie layer and the core layer comprises a polymer having a flexural modulus of less than or equal to about 50 Kpsi.

9. The multi-layer film of claim 1, wherein the first tie layer further comprises an adhesive resin.

10. The multi-layer film of claim 1, wherein the sealant layer has a thickness of between about 0.02 mil and about 1.0 mil (0.5 μm-25 μm).

11. The multi-layer film of claim 1, wherein the sealant layer comprises a sealant-layer polymer selected from the group consisting of Zeigler-Natta or metallocene catalyzed; PP homopolymer, an EP copolymer, a PB copolymer, an EB copolymer, an EPB terpolymer, an ethylene vinyl acetate, and blends thereof.

12. The multi-layer film of claim 1, wherein at least one of the core layer and the first tie layer further comprises a hydrocarbon resin or antiblock.

13. The multi-layer film of claim 1, wherein at least one of the core layer and the first tie layer further comprises at least one additive selected from the group consisting of:
   i) an opacifying agent selected from the group consisting of iron oxide, carbon black, aluminum, titanium dioxide ($TiO_2$), talc, and combinations thereof
   ii) a void-initiating particle selected from the group consisting of polybutylene terephthalate, calcium carbonate ($CaCO_3$), and combinations thereof and
   iii) a hydrocarbon resin, the hydrocarbon resin comprising petroleum resin, terpene resin, styrene resin, cyclopentadiene resin, saturated alicyclic resin, and combinations thereof, said resin having a number average molecular weight of less than 5000, said resin having a softening point in the range of from 60°-180° C.

14. The multi-layer film of claim 1, wherein the film is formed as a package.

15. The package of claim 14, wherein the package is a pouch.

16. A multi-layer film, comprising:
(a) a core layer having a first side and a second side, said core layer comprising a core polymer and at least one soft polymer;
(b) a first tie layer having a first side and a second side, the second side of the first tie layer on the first side of said core layer, said first tie layer comprising a soft polymer and, optionally, a tie layer polymer, the optional tie layer polymer comprising at least one of a $C_2$-$C_8$ alpha-olefin homo-, co-, or terpolymer, a metallocene catalyzed homo-, co-, or terpolymer comprising propylene, and blends thereof; and
(c) a sealant layer on the first side of the first tie layer,
wherein the soft polymer of at least one of the first tie layer and the core layer comprises a polymer having a flexural modulus of less than or equal to about 80 Kpsi and a Vicat softening point of less than or equal to about 221° F. (105° C.), further comprising:
an outer skin layer having a first side and a second side, the first side of the outer skin layer on the second side of the core layer, the outer skin layer comprising a polymer selected from the group consisting of polyethylene (PE), polypropylene (PP), ethylene-propylene (EP) copolymer, ethylene-propylene-butylene (EPB) terpolymer, an ethylene-vinyl alcohol (EVOH) polymer, and blends thereof:
a second tie layer having a first side and a second side, the first side of the second tie layer is on the second side of the core layer and the second side of the second tie layer is on the first side of the outer skin layer, wherein the second tie layer comprises at least one of a propylene polymer, a soft polymer, and an adhesive resin, wherein the soft polymer of the second tie layer comprises between about 10 percent and 90 percent by weight of said second tie layer.

17. The multi-layer film of claim 16, wherein the propylene polymer is isotactic polypropylene, the adhesive resin comprises maleic-anhydride modified polypropylene, and the soft polymer of the second tie layer is the soft polymer of the first tie layer.

18. The multi-layer film of claim 16, wherein the second side of the outer skin layer is treated with a treatment selected from the group consisting of corona, flame, polarized flame, and plasma.

19. The multi-layer film of claim 18, wherein the second side of the outer skin layer is coated with at least one coating selected from the group consisting of EVOH, acrylic polymers, polyvinylidene chloride (PVDC), ethylene acrylic acid copolymers (EAA), ethylene methyl acrylate copolymers (EMA), poly(vinyl)alcohol (PVOH), and combinations thereof.

20. The multi-layer film of claim 18, wherein the second side of the outer skin layer is metallized.

21. The multi-layer film of claim 20, wherein the outer skin layer is metallized by vacuum deposition of a metal selected from the group consisting of aluminum, copper, silver, chromium, and mixtures thereof.

* * * * *